(12) United States Patent
Kim et al.

(10) Patent No.: US 11,225,050 B1
(45) Date of Patent: Jan. 18, 2022

(54) STEEL SHEET FOR HOT PRESS AND MANUFACTURING METHOD THEREOF

(71) Applicant: Hyundai Steel Company, Incheon (KR)

(72) Inventors: Sung Min Kim, Incheon (KR); Hye Rim Choi, Incheon (KR)

(73) Assignee: Hyundai Steel Company, Incheon (KR)

( * ) Notice: Subject to any disclaimer, the term of this patent is extended or adjusted under 35 U.S.C. 154(b) by 0 days.

(21) Appl. No.: 17/110,153

(22) Filed: Dec. 2, 2020

(30) Foreign Application Priority Data

Jun. 30, 2020 (KR) .................... 10-2020-0080413

(51) Int. Cl.
| | |
|---|---|
| B32B 15/10 | (2006.01) |
| B32B 15/01 | (2006.01) |
| C23C 2/12 | (2006.01) |
| C22C 21/00 | (2006.01) |
| C23C 2/40 | (2006.01) |
| C22C 38/00 | (2006.01) |
| C22C 38/06 | (2006.01) |
| C22C 38/02 | (2006.01) |
| C22C 38/04 | (2006.01) |
| C22C 38/14 | (2006.01) |

(52) U.S. Cl.
CPC ............ *B32B 15/012* (2013.01); *C22C 21/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/14* (2013.01); *C23C 2/12* (2013.01); *C23C 2/40* (2013.01); *Y10T 428/12757* (2015.01)

(58) Field of Classification Search
None
See application file for complete search history.

(56) References Cited

U.S. PATENT DOCUMENTS

| | | | |
|---|---|---|---|
| 6,017,643 A | 1/2000 | Kobayashi et al. | |
| 6,296,805 B1 | 10/2001 | Laurent et al. | |
| 2004/0009366 A1* | 1/2004 | Takagi | ............... C22C 38/04 |
| | | | 428/653 |
| 2011/0165436 A1* | 7/2011 | Drillet | ............... B32B 15/012 |
| | | | 428/653 |
| 2011/0174418 A1* | 7/2011 | Maki | ............... C22C 38/04 |
| | | | 148/531 |

(Continued)

FOREIGN PATENT DOCUMENTS

| | | |
|---|---|---|
| EP | 0870847 A1 | 10/1998 |
| EP | 2746422 A1 | 6/2014 |

(Continued)

*Primary Examiner* — Seth Dumbris
(74) *Attorney, Agent, or Firm* — Mintz, Levin, Cohn, Ferris, Glovsky and Popeo, P.C.; Peter F. Corless

(57) ABSTRACT

Disclosed is a steel sheet for hot press forming, which includes: a base steel sheet; and a plating layer disposed on the base steel sheet and including a diffusion layer and a surface layer that are sequentially laminated, wherein the diffusion layer includes an Fe—Al alloy layer and an Fe—Al intermetallic compound layer that are sequentially disposed on the base steel sheet and each include silicon, and an area fraction of the Fe—Al intermetallic compound layer with respect to the diffusion layer is 84.5% to 98.0%.

13 Claims, 2 Drawing Sheets

(56) References Cited

U.S. PATENT DOCUMENTS

| | | | | |
|---|---|---|---|---|
| 2013/0095345 | A1* | 4/2013 | Maki | C22C 38/002 |
| | | | | 428/653 |
| 2016/0186284 | A1* | 6/2016 | Furukawa | B32B 15/012 |
| | | | | 428/653 |
| 2016/0362764 | A1* | 12/2016 | Sohn | B32B 15/012 |
| 2019/0381764 | A1* | 12/2019 | Kang | C23C 2/12 |
| 2021/0095368 | A1* | 4/2021 | Fujita | C23C 2/28 |

FOREIGN PATENT DOCUMENTS

| | | |
|---|---|---|
| EP | 3239337 A1 | 11/2017 |
| EP | 3239338 A1 | 11/2017 |
| EP | 3305938 A1 | 4/2018 |
| EP | 3359703 A1 | 8/2018 |
| EP | 3378965 A1 | 9/2018 |
| EP | 3396010 A1 | 10/2018 |
| EP | 3623493 A1 | 3/2020 |
| JP | H11276891 A | 10/1999 |
| JP | 5444650 B2 | 3/2014 |
| KR | 101858863 B1 | 5/2018 |
| KR | 2019-0077928 A | 7/2019 |
| KR | 20200035740 A | 4/2020 |
| KR | 20200063983 A | 6/2020 |
| KR | 20200066239 A | 6/2020 |
| WO | 2017059578 A1 | 4/2017 |
| WO | 2018216589 A1 | 11/2018 |
| WO | 2020067678 A1 | 4/2020 |
| WO | 2020111775 A1 | 6/2020 |
| WO | 2020111881 A1 | 6/2020 |

* cited by examiner

STEEL SHEET FOR HOT PRESS AND MANUFACTURING METHOD THEREOF

CROSS-REFERENCE TO RELATED APPLICATION

This application is based on and claims priority under 35 U.S.C. § 119 to Korean Patent Application No. 10-2020-0080413, filed on Jun. 30, 2020, in the Korean Intellectual Property Office, the disclosure of which is incorporated by reference herein in its entirety.

BACKGROUND

1. Field

Exemplary embodiments of the present invention relate to a steel sheet for hot press forming and a method of manufacturing the steel sheet.

2. Description of the Related Art

As the environmental regulations and safety standards in the automobile industry have been recently strengthened, the application of high-strength steel has increased for weight reduction and stability of automobiles. High-strength steel may have high-strength characteristics compared to its weight. However, during processing, a material may break or a spring back phenomenon may occur, and it is difficult to form a high-steel product having a complex and precise shape. Therefore, as a method to solve this, use of hot press forming has been expanded.

In hot press forming, a steel sheet is pressed by being heated at a high temperature to easily form steel, and the strength of a formed product may be secured by performing rapid cooling through a mold. However, since the steel sheet is heated at a high temperature for hot press forming, the surface of the steel sheet is oxidized. In order to solve this issue, the invention of U.S. Pat. No. 6,296,805 proposes a method of hot press forming a steel sheet subjected to aluminum plating. According to the invention of U.S. Pat. No. 6,296,805, because an aluminum plating layer exists on the surface of the steel sheet, the surface of the steel sheet may be prevented from oxidizing by heating the steel sheet.

However, when the steel sheet is heated, Fe is diffused from the steel sheet into the aluminum plating layer, and then the aluminum plating layer is alloyed. Also, when such an aluminum plated steel sheet is hot press formed, cracks may occur in a plating layer, which becomes brittle due to alloying. In the meantime, since the aluminum plating layer has no sacrificial corrosion resistance, cracks may occur in the plating layer, and when the surface of the steel sheet is exposed, the corrosion resistance of a hot press-formed product may rapidly deteriorate.

The Korean Patent No. 10-2019-0077928 discloses an iron-aluminum-based alloy-plated steel sheet which includes an Fe—Al alloy plating layer formed on the surface of a holding steel sheet, and when the Fe—Al alloy plating layer is divided into four equal portions in the thickness direction to form four layers, the hardness of the other layers except the outermost layer is less than that of the outer layer thereof, thereby suppressing the occurrence of cracks in the surface thereof. However, because the hardness of the Fe—Al alloy plating layer decreases toward the outside, during a hot press process, the Fe—Al alloy plating layer may be attached to a mold and peeled.

SUMMARY

Exemplary embodiments include a steel sheet for hot press forming, the steel sheet preventing or reducing the occurrence of cracks in a plating layer during hot press forming, and a method of manufacturing the steel sheet.

According to one exemplary embodiment, provided is a steel sheet for hot press forming, which includes: a base steel sheet; and a plating layer disposed on the base steel sheet and having a diffusion layer and a surface layer that are sequentially laminated, wherein the diffusion layer includes an Fe—Al alloy layer and an Fe—Al intermetallic compound layer that are sequentially disposed on the base steel sheet and each include silicon, and an area fraction of the Fe—Al intermetallic compound layer with respect to the diffusion layer is 84.5% to 98.0%.

In the exemplary embodiment, the Fe—Al intermetallic compound layer may include a first layer and a second layer that are sequentially laminated, a hardness of the Fe—Al alloy layer may be greater than a first hardness of the first layer and a second hardness of the second layer, and the second hardness may be greater than the first hardness.

In the exemplary embodiment, an area fraction of the diffusion layer with respect to the plating layer may be 10% to 35%.

In the exemplary embodiment, in the Fe—Al alloy layer, the first layer, and the second layer, a content of aluminum in the first layer may be the least, and a content of the silicon in the first layer may be the greatest.

In the exemplary embodiment, an average thickness of the first layer may be 50 nm to 500 nm, and an average thickness of the second layer may be 1 μm to 16 μm.

In the exemplary embodiment, an average thickness of the Fe—Al alloy layer may be 50 nm to 500 nm.

In the exemplary embodiment, an area fraction of the Fe—Al alloy layer with respect to the diffusion layer may be 2.0% to 15.5%.

In the exemplary embodiment, the base steel sheet may include carbon (C) in an amount of 0.01 wt % to 0.5 wt %, silicon (Si) in an amount of 0.01 wt % to 1.0 wt %, manganese (Mn) in an amount of 0.5 wt % to 3.0 wt %, phosphorus (P) in an amount greater than 0 wt % and less than or equal to 0.05 wt %, sulfur (S) in an amount greater than 0 wt % and less than or equal to 0.01 wt %, aluminum (Al) in an amount greater than 0 wt % and less than or equal to 0.1 wt %, nitrogen (N) in an amount greater than 0 wt % and less than or equal to 0.001 wt %, balance iron (Fe), and other inevitable impurities.

In the exemplary embodiment, the base steel sheet may further include one or more of niobium (Nb), titanium (Ti), chromium (Cr), molybdenum (Mo), and boron (B).

According to another exemplary embodiments, provided is a method of manufacturing a steel sheet for hot press, which includes: forming a hot-dip plating layer on a surface of a base steel sheet by immersing the base steel sheet, which is cold-rolled or hot-rolled, into a plating bath having a temperature of 650° C. to 700° C.; and a cooling operation of forming a plating layer by cooling the base steel sheet on which the hot-dip plating layer, wherein the plating bath includes silicon in an amount of 4 wt % to 12 wt %, iron in an amount of 1.0 wt % to 4.0 wt %, and balance aluminum, the cooling operation includes: a first cooling operation of cooling the base steel sheet at a first average cooling rate up to 550° C.; and a second cooling operation of cooling the base steel sheet at a second average cooling rate up to room temperature, and the first average cooling rate is greater than the second average cooling rate.

In the exemplary embodiment, the first average cooling rate may be greater than or equal to 20° C./s.

In the exemplary embodiment, the base steel sheet may pass through the plating bath and may be immersed in the plating bath, and a passing rate of the base steel sheet passing through the plating bath may be 1 mpm to 250 mpm.

In the exemplary embodiment, the method may, before the cooling operation, may further include adjusting a thickness of the hot-dip plating layer by spraying air or gas onto the base steel sheet.

DETAILED DESCRIPTION

Figure 1:
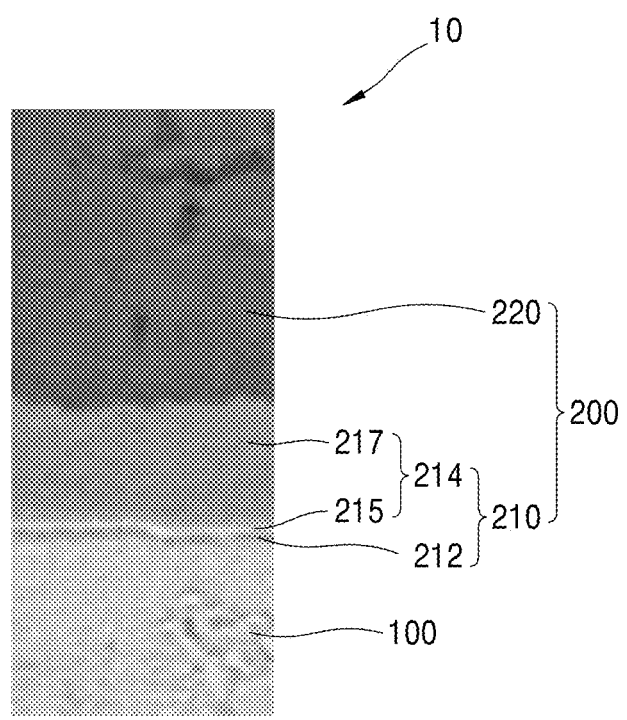
FIG. 1 is a cross-sectional view of a steel sheet for hot press forming according to an exemplary embodiment.

While example embodiments are capable of various modifications and alternative forms, embodiments thereof are shown by way of example in the drawings and will herein be described in detail. Effects and features of the disclosure, and a method of achieving thereof will be apparent with reference to the embodiments described later in detail together with the drawings. However, the disclosure is not limited to the embodiments described below and may be implemented in various forms.

In the following embodiments, the terms, "first", "second", etc. are only used to distinguish one element from another rather than a limited meaning.

The singular forms are intended to include the plural forms as well, unless the context clearly indicates otherwise.

It will be understood that the terms "comprises," "comprising," "includes," or "including," when used herein, specify the presence of stated features or elements, but do not preclude the presence or addition of one or more other features or elements.

When a layer, area, or element is referred to as being on another layer, area, or element, it may be directly or indirectly on the other layer, area, or element, and intervening layers, areas, or elements may be present.

In the drawings, the sizes of elements may be exaggerated or reduced for convenience of description. Since the size and thickness of each element shown in the drawings are shown for convenience of description, the disclosure is not necessarily limited to those shown.

When a certain embodiment is capable of being implemented differently, a particular process order may be performed differently from the described order. Two processes described in succession may be performed substantially simultaneously or may be performed in an order opposite to the described order.

Hereinafter, exemplary embodiments will be described in detail with reference to the accompanying drawings, and when describing with reference to the drawings, the same or corresponding elements will be given the same reference numerals.

FIG. 1 is a cross-sectional view of a steel sheet for hot press according to an exemplary embodiment.

Referring to FIG. 1, a steel sheet 10 for hot press according to one embodiment may include a base steel sheet 100 and a plating layer 200 disposed on the base steel sheet 100.

The base steel sheet 100 may be a steel sheet which is manufactured by performing a hot rolling process and a cold rolling process on a steel slab that is cast to include a certain alloy element in a certain content. For example, the base steel sheet 100 include carbon (C), silicon (Si), manganese (Mn), phosphorus (P), sulfur (S), aluminum (Al), nitrogen (N), balance iron (Fe), and other inevitable impurities. In addition, the base steel sheet 100 may further include one or more of niobium (Nb), titanium (Ti), chromium (Cr), molybdenum (Mo), and boron (B).

Carbon (C) is a major element that determines the strength and hardness of the base steel sheet 100 and, after a hot press process, is added to secure the tensile strength of the base steel sheet 100 and secure hardenability characteristics. Such carbon may be included in an amount of 0.01 wt % to 0.5 wt % with respect to a total weight of the base steel sheet 100. When a content of carbon is less than 0.01 wt %, the mechanical strength of the base steel sheet 100 may not be secured. When the content of carbon exceeds 0.5 wt %, the toughness of the base steel sheet 100 may be reduced or the brittleness of the base steel sheet 100 may not be controlled.

Silicon (Si) serves as a ferrite stabilizing element in the base steel sheet 100. Silicon (Si) is a solid solution strengthening element, improves the ductility of the base steel sheet 100, and may improve carbon concentration in austenite by suppressing the formation of low-temperature region carbide. In addition, silicon (Si) is a key element in hot-rolled, cold-rolled, and hot-pressed structure homogenization (perlite, manganese segregation control) and ferrite fine dispersion. Such silicon may be included in an amount of 0.01 wt % to 1.0 wt % with respect to the total weight of the base steel sheet 100. When silicon is included less than 0.01 wt %, the above-described effects may not be acquired. When the content of silicon exceeds 1.0 wt %, hot rolling and cold rolling loads increase, hot-rolling red scale becomes excessive, and plating characteristics of the base steel sheet 100 may be deteriorated.

Manganese (Mn) is added to increase hardenability and strength during heat treatment. Manganese may be included in an amount of 0.5 wt % to 3.0 wt % with respect to the total weight of the base steel sheet 100. When a content of manganese is less than 0.5 wt %, a grain refinement effect is insufficient, and thus, a hard phase fraction in a formed product may be insufficient after hot press. When the content of manganese exceeds 3.0 wt %, ductility and toughness may be reduced due to manganese segregation or a pearlite band, thereby causing a decrease in a bending performance and generating an inhomogeneous microstructure.

Phosphorus (P) may be included in an amount greater than 0 wt % and less than or equal to 0.05 wt % with respect to the total weight of the base steel sheet 100 to prevent a decrease in the toughness of the base steel sheet 100. When phosphorus exceeds 0.05 wt % and is included in the base steel sheet 100, an iron phosphide compound may be formed to reduce the toughness, and cracks may be generated in the base steel sheet 100 during a manufacturing process.

Sulfur (S) may be included in an amount greater than 0 wt % and less than or equal to 0.01 wt % with respect to the total weight of the base steel sheet 100. When the content of sulfur exceeds 0.01 wt %, hot workability may be deteriorated, and a surface detect such as cracks may occur due to formation of a large inclusion.

Aluminum (Al) serves as a deoxidizing agent for removing oxygen in the base steel sheet 100. Aluminum may be included in an amount greater than 0 wt % and less than or equal to 0.1 wt % with respect to the total weight of the base steel sheet 100. When a content of aluminum exceeds 0.1 wt %, a nozzle may be clogged during steel making, and, during casting, hot brittleness may occur due to aluminum oxide or the like, and thus, cracks may occur in the base steel sheet 100 or ductility may be reduced.

When a large amount of nitrogen is included in the base steel sheet 100, an amount of solid solution nitrogen may increase, thereby decreasing impact characteristics and elongation of the base steel sheet 100 and decreasing the toughness of a joint. Therefore, nitrogen may be included in an amount greater than 0 wt % and less than or equal to 0.001 wt % with respect to the total weight of the base steel sheet 100.

Niobium (Nb) is added to increase strength and toughness according to a decrease in the size of a martensite packet. Niobium may be included in an amount of 0.005 wt % to 0.1 wt % with respect to the total weight of the base steel sheet 100. When niobium is included in the above range, a grain refinement effect of steel may be high in hot rolling and cold rolling processes, the occurrence of cracks in a slab and the occurrence of brittle fractures of a product may be prevented during steel making/performing, and the generation of steel-making coarse precipitates may be minimized.

Titanium (Ti) may be added to strengthen hardenability and increase a material by forming precipitates after hot press heat treatment. In addition, titanium effectively contributes to refinement of austenite grains by forming a precipitated phase such as Ti (C, N) at a high temperature. Titanium may be included in an amount of 0.005 wt % to 0.1 wt % with respect to the total weight of the base steel sheet 100. When titanium is included in the above content range, poor performance and coarsening of precipitates may be prevented, physical properties of steel may be easily secured, and defects such as the occurrence of cracks in the surface of the steel may be prevented.

Chromium (Cr) is added to improve the hardenability and strength of the base steel sheet 100. Chromium may be included in an amount of 0.01 wt % to 0.5 wt % with respect to the total weight of the base steel sheet 100. When chromium is included in the above range, the hardenability and strength of the base steel sheet 100 may be improved, and an increase in production cost and a decrease in toughness of steel may be prevented.

Molybdenum (Mo) may contribute to improving the strength of the base steel sheet 100 by suppressing coarsening of precipitates and increasing hardenability during hot rolling and hot press. Molybdenum (Mo) as described above may be included in an amount of 0.001 wt % to 0.008 wt % with respect to the total weight of the base steel sheet 100.

Boron (B) is added to secure the hardenability and strength of the base steel sheet 100 by securing a martensite structure and has a grain refinement effect by increasing an austenite grain growth temperature. Boron may be included in an amount of 0.001 wt % to 0.008 wt % with respect to the total weight of the base steel sheet 100. When boron is included in the above range, the occurrence of hard grain boundary brittleness may be prevented, and high toughness and bendability may be secured.

The plating layer 200 is formed in a thickness of 10 μm to 50 μm on at least one surface of the base steel sheet 100 and includes aluminum (Al). Here, the thickness of the plating layer 200 refers to an average thickness of the plating layer 200 over the entire area of the plating layer 200. When the thickness of the plating layer 200 is less than 10 μm, corrosion resistance is lowered. When the thickness of the plating layer 200 exceeds 50 μm, the productivity of the steel sheet 10 for hot press may be reduced, and the plating layer 200 may be attached to a roller or a mold and peeled from the base steel sheet 100 during the hot press process.

The plating layer 200 may include a diffusion layer 210 and a surface layer 220 sequentially laminated on the base steel sheet 100.

The surface layer 220 includes aluminum (Al) greater than or equal to 80 wt % and prevents oxidation of the base steel sheet 100 or the like. The diffusion layer 210 may be formed by mutually diffusing Fe of the base steel sheet 100 and Al of the plating layer 200, and may include an aluminum-iron (Al—Fe) and aluminum-iron-silicon (Al—Fe—Si) compound. The diffusion layer 210 may include iron (Fe) in an amount of 20 wt % to 60 wt %, aluminum (Al) in an amount of 30 wt % to 80 wt %, and silicon (Si) in an amount of 0.1 wt % to 40 wt %.

The diffusion layer 210 as described above may have a higher melting point than the surface layer 220 to prevent the occurrence of liquid metal embrittlement in which the surface layer 220 is melted during the hot press process, and thus, Al penetrates into a structure of the base steel sheet 100.

For this, an area fraction of the diffusion layer 210 (a cross-sectional area of the diffusion layer 210÷a cross-sectional area of the plating layer 200), which is a ratio of the cross-sectional area of the diffusion layer 210 to the cross-sectional of the plating layer 200, may be 10% to 35%. Here, the cross-sectional area of the plating layer 200 and the cross-sectional area of the diffusion layer 210 refer to cross-sectional areas at the same certain location. This may be applied equally to area fractions for other layers below.

The diffusion layer 210 may include an Fe—Al alloy layer 212 and an Fe—Al intermetallic compound layer 214 sequentially disposed on the base steel sheet 100 and each including silicon.

The Fe—Al alloy layer 212 may include Al in an amount of 50 wt % to 75 wt %, Fe in an amount of 10 wt % to 50 wt %, and Si in an amount of 0.1 wt % to 15 wt % and may have a density of 4.0 g/cm$^3$ to 4.8 g/cm$^3$. As an example, the Fe—Al alloy layer 212 may include $Al_5Fe_2$ and may have a greater hardness than the diffusion layer 210.

The Fe—Al alloy layer 212 as described above prevents the liquid metal embrittlement. However, the Fe—Al alloy layer 212 is made of a hard phase and maintains high hardness even during the hot press process, and thus may generate cracks and decrease the formability of the steel sheet 10 for hot press during the hot press process. Therefore, for preventing the liquid metal embrittlement and preventing the decrease in the formability of the steel sheet 10 for hot press, an average thickness of the Fe—Al alloy layer 212 may be 50 nm to 500 nm, alternatively, 50 nm to 300 nm. In addition, an area fraction of the Fe—Al alloy layer 212 with respect to the diffusion layer 210 may be 2.0% to 15.5%.

The Fe—Al intermetallic compound layer 214 may include Al in an amount of 35 wt % to 85 wt %, Fe in an amount of 25 wt % to 45 wt %, and Si in an amount of 8 wt % to 30 wt %, and may have a density of 2.9 g/cm$^3$ to 5.6 g/cm$^3$. The Fe—Al intermetallic compound layer 214 may have a lower hardness than the Fe—Al alloy layer 212 and operates as a buffer against a compressive force during the hot press process of the steel sheet 10 for hot press, thereby preventing cracks from occurring in the plating layer 200.

In more detail, during heating for hot press, additional mutual diffusion occurs between the plating layer 200 and the base steel sheet 100. Here, the Fe—Al alloy layer 212 may maintain a relatively high hardness, but the Fe—Al intermetallic compound layer 214 may form a tau phase or/and AlFe, and a hardness thereof may be lowered. Therefore, the diffusion layer 210 may include the Fe—Al intermetallic compound layer 214 capable of operating as a buffer against the compressive force during the hot press process to thereby improve crack resistance.

An area fraction of the Fe—Al intermetallic compound layer 214 as described above with respect to the diffusion layer 210 may be 84.5% to 98.0%. When the cross-sectional area of the Fe—Al intermetallic compound layer 214 with respect to the cross-sectional area of the diffusion layer 210 is formed to be greater than or equal to 84.5%, the Fe—Al intermetallic compound layer 214 may effectively absorb an external force that generates cracks in the plating layer 200 during the hot press process. However, when the area fraction of the Fe—Al intermetallic compound layer 214 with respect to the diffusion layer 210 exceeds 98.0%, an average thickness of the Fe—Al alloy layer 212 may be relatively reduced, and thus the liquid metal embrittlement may not be prevented. Also, the Fe—Al intermetallic compound layer 214, which has the area fraction exceeding 98.0%, may not be secured in the temperature range of a plating bath for melting Al described later.

In addition, the Fe—Al intermetallic compound layer 214 may include a first layer 215 and a second layer 217 that are sequentially laminated. The first layer 215 and the second layer 217 are each formed of an Fe—Al intermetallic compound including Si, and a first hardness of the first layer 215 may be less than a second hardness of the second layer 217. In other words, the Fe—Al alloy layer 212, the second layer 217, and the first layer 215 may have a high hardness value in that order. Accordingly, although a phase change of each layer occurs or the location of each layer is changed during the hot press process, a layer structure capable of absorbing an external force that causes the occurrence of cracks or reducing of formability may be obtained.

Because the Fe—Al intermetallic compound layer 214 is formed on the Fe—Al alloy layer 212 including Si having low solid solubility, a content of Si of the first layer 215 may gradually increase toward the surface of the plating layer 200, and the second layer 217 may have relatively higher Al content and lower Si content than the first layer 215.

For example, the first layer 215 may include Al in an amount of 35 wt % to 51 wt %, Fe in an amount of 25 wt % to 45 wt %, and Si in an amount of 15 wt % to 30 wt %, and may have a density of 4.6 g/cm$^3$ to 5.6 g/cm$^3$. The second layer 217 may include Al in an amount of 55 wt % to 85 wt %, Fe in an amount of 10 wt % to 30 wt %, and Si in an amount of 8 wt % to 25 wt %, and may have a density of 2.9 g/cm$^3$ to 3.9 g/cm$^3$. In addition, the Fe—Al alloy layer 212, the second layer 217, and the first layer 215 may have a high Al content (wt %) value in that order, and the second layer 217, the first layer 215, and the Fe—Al alloy layer 212 may have a high Si content (wt %) value in that order. Therefore, although a phase change of each layer occurs or the location of each layer is changed during the hot pressing process, a layer structure capable of absorbing an external force that causes the occurrence of cracks or lowering of formability may be secured.

In other words, in the Fe—Al alloy layer 212, the first layer 215, and the second layer 217, a content of Al in the first layer 215 is the least, and a content of Si in the first layer 215 is the greatest, and thus, the first layer 215 may have the lowest hardness.

The first layer 215 may prevent cracks from occurring in the plating layer 200 by absorbing an external force causing cracks in the plating layer 200 during the hot press process. In addition, although cracks occur in the second layer 217 or the Fe—Al alloy layer 212 having a relatively high hardness than the first layer 215 during the hot press process, the first layer 215 that is soft not only operates as a buffer but also prevents crack propagation at an interface formed during the hot press process, thereby effectively preventing cracks generated in the second layer 217 or the Fe—Al alloy layer 212 from being transmitted to the base steel sheet 100 or the plating layer 200. Accordingly, when the Fe—Al intermetallic compound layer 214 has a laminated structure of the first layer 215 and the second layer 217, the occurrence of cracks in the steel sheet 10 for hot press during the hot press process may be more effectively prevented or minimized.

The second layer 217 may absorb an external force and improve adhesion of the plating layer 200 during the hot press process. The second layer 217 has a greater Al content and a less Si content than the first layer 215, and thus has a composition more similar to the surface layer 220 than the Fe—Al alloy layer 212 and the first layer 215. Therefore, the second layer 217 may improve the adhesion of the plating layer 200.

When an average thickness of the first layer 215 is less than 50 nm, an effect of absorbing an external force causing cracks in the plating layer 200 during the hot press process decreases sharply. When the average thickness of the first layer 215 is greater than 50 nm, Kirkendal voids may be generated due to a difference in diffusion rates of Al and Fe, thereby decreasing performance such as weldability. Therefore, the average thickness of the first layer 215 may be 50 nm to 500 nm, preferably, 50 nm to 300 nm.

In addition, when an average thickness of the second layer 217 is less than 1 μm, an Fe2Al5 layer having high brittleness may be formed due to diffusion of Fe during the hot press process, and thus, cracks may occur in the plating layer 200 or the plating layer 200 may be peeled. When the average thickness of the second layer 217 is greater than 16 μm, stress remaining in the plating layer 200 may increase after the hot press process, and thus, cracks may occur in the plating layer 200 or the plating layer 200 may be peeled. Accordingly, the average thickness of the second layer 217 may be 1 μm to 16 μm.

As described above, when the Fe—Al intermetallic compound layer 214 has the laminated structure of the first layer 215 and the second layer 217, not only cracks may be more effectively prevented from occurring in the plating layer 200, but also a bonding strength of the surface layer 220 may be improved, thereby increasing the stability of the plating layer 200.

Figure 2:
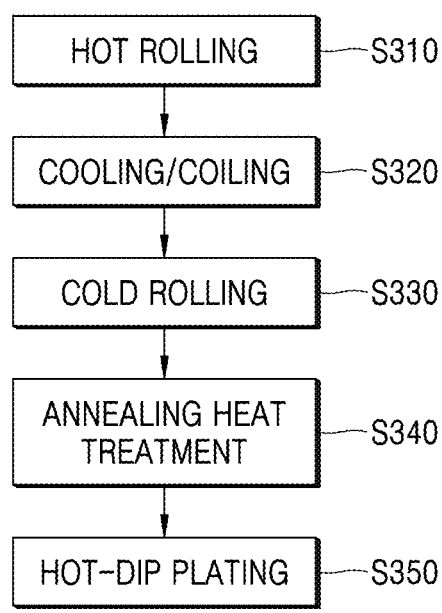
FIG. 2 is a flowchart schematically illustrating a method of manufacturing the steel sheet for hot press forming of FIG. 1.

FIG. 2 is a flowchart schematically illustrating a method of manufacturing a steel sheet for hot press of FIG. 1. Hereinafter, a method of manufacturing a steel sheet for hot press will be described with reference to FIGS. 1 and 2.

A method of manufacturing a steel sheet for hot press according to one embodiment may include hot rolling operation S310, cooling/coiling operation S320, a cold rolling operation S330, annealing heat treatment operation S340, and hot-dip plating operation S350 for a steel slab.

A semi-finished steel slab that is an object of a process of forming a plated steel sheet is provided. The steel slab may include carbon (C) in an amount of 0.01 wt % to 0.5 wt %, silicon (S) in an amount of 0.01 wt % to 1.0 wt %, manganese (Mn) in an amount of 0.5 wt % to 3.0 wt %, phosphorus in an amount greater than 0 wt % and less than or equal to 0.05 wt %, sulfur (S) in an amount greater than 0 wt % and less than or equal to 0.01 wt %, aluminum (Al) in an amount greater than 0 wt % and less than or equal to 0.1 wt %, nitrogen in an amount greater than 0 wt % and less than or equal to 0.001 wt %, balance iron (Fe), and other inevitable impurities. In addition, the steel slab may further include one or more of niobium (Nb) in an amount of 0.005 wt % to 0.1 wt %, titanium (Ti) in an amount of 0.005 wt % to 0.1 wt %, chromium (Cr) in an amount of 0.01 wt % to 0.5 wt %, molybdenum (Mo) in an amount of 0.001 wt % to 0.008 wt %, and boron (B) in an amount of 0.001 wt % to 0.008 wt %.

Reheating operation of the steel slab is performed for hot rolling. In the reheating operation of the steel slab, components segregated during casting are resolved by reheating, to a certain temperature, the steel slab secured through a continuous casting process. In one exemplary embodiment, a slab reheating temperature (SRT) may be 1200° C. to 1400° C. When the slab reheating temperature (SRT) is lower than 1200° C., the components segregated during casting may not be sufficiently resolved, and thus, a homogenization effect of alloy elements may not be significantly shown, and a solid solution effect of titanium (Ti) may not be significantly shown. As the slab reheating temperature (SRT) is a high, the slab reheating temperature (SRT) is appropriate for homogenization. However, when the slab reheating temperature (SRT) exceeds 1400° C., an austenite grain size may increase, and thus, strength may not be secured, and only manufacturing cost of the steel sheet may increase due to an excessive heating process.

In hot rolling operation S310, the reheated steel slab is hot rolled at a certain finishing delivery temperature (FDT). In one embodiment, the finishing delivery temperature may be 880° C. to 950° C. Here, when the finishing delivery temperature (FDT) is lower than 880° C., workability of the steel sheet may not be secured due to the occurrence of a mixed structure due to rolling over an abnormal area. Also, the workability may be deteriorated due to an uneven microstructure, and a passing ability may be deteriorated during hot rolling due to a rapid phase change. When the finishing delivery temperature (FDT) exceeds 950° C., austenite grains are coarsened. In addition, TiC precipitates may be coarsened to thereby deteriorate the performance of a final part.

In cooling/coiling operation S320, the hot-rolled steel sheet is cooled to a certain coiling temperature (CT) and coiled. In one embodiment, the coiling temperature (CT) may be 550° C. to 800° C. The coiling temperature (CT) affects the redistribution of carbon (C). When the coiling temperature (CT) is less than 550° C., a low-temperature phase fraction may increase due to subcooling, thereby increasing the strength, intensifying a rolling road during cold rolling, and rapidly deteriorating ductility. In contrast, when the coiling temperature (CT) exceeds 800° C., formability and strength deterioration may occur due to abnormal grain growth or excessive grain growth.

In cold rolling operation S330, the coiled steel sheet is uncoiled, pickled, and then cold-rolled. Here, pickling is performed to remove scale of the coiled steel sheet, i.e., a hot-rolled coil manufactured through the hot rolling process described above.

Annealing heat treatment operation S340 is operation of performing, on the cold-rolled steel sheet, annealing heat treatment at a temperature higher than or equal to 700° C. In one embodiment, annealing heat treatment includes operation of heating a cold-rolled sheet material and cooling the heated cold-rolled sheet material at a certain cooling rate.

Hot-dip plating operation S350 is operation of forming a plating layer on the annealed heat-treated steel sheet. In one embodiment, in hot-dip plating operation S350, the plating layer 200 of Al—Si may be formed on the annealed heat-treated steel sheet, i.e., on the base steel sheet 100.

In detail, hot-dip plating operation S350 may include: operation of forming a hot-dip plating layer on the surface of the base steel sheet 100 by immersing the base steel sheet 100 in a plating bath having a temperature of 650° C. to 700° C.; and cooling operation of forming the plating layer 200 by cooling the base steel sheet 100 on which the hot-dip plating layer is formed.

The plating bath may include Si in an amount of 4 wt % to 12 wt %, Fe in an amount of 1.0 wt % to 4.0 wt %, and balance Al. In particular, Si included in the plating bath may suppress the growth of the Fe—Al alloy layer 212 when the plating layer 200 is formed. Therefore, when a content of Si is less than 4 wt %, the Fe—Al alloy layer 212 may be formed too thick, thereby reducing the formability of the steel sheet 10 for hot press and easily generating cracks in the steel sheet 10 for hot press. In contrast, when the content of Si is greater than 12 wt %, the growth of the Fe—Al intermetallic compound layer 214, in particular, the second layer 217 may become dominant. Accordingly, an area fraction of the Fe—Al alloy layer 212 with respect to the diffusion layer 210 may be limited to 2.0% to 15.5% by adjusting the content of Si in the plating bath. Therefore, the Fe—Al intermetallic compound layer 214 may be formed in an area fraction of 84.5% to 98.0% with respect to the diffusion layer 210, and thus, the occurrence of cracks in the plating layer 200 during a hot press process may be effectively prevented or minimized.

In addition, the plating bath may include, as additional elements, Mn, Cr, Mg, Ti, Zn, Sb, Sn, Cu, Ni, Co, In, Bi, and the like.

The cooling operation of cooling the base steel sheet 100 on which the hot-dip plating layer is formed may include: first cooling operation of cooling the base steel sheet 100 at a first average cooling rate from a temperature of the plating bath to 550° C.; and second cooling operation of cooling the base steel sheet 100 at a second average cooling rate from 550° C. to room temperature. Here, the first average cooling rate may be greater than the second average cooling rate. For example, the first average cooling rate may be greater than or equal to 20° C./s, and an overall average cooling rate for cooling from the temperature of the plating bath to the room temperature may be 1° C./to 50° C./s.

In addition, the base steel sheet 100 may pass through the plating bath to form the hot-dip plating layer on the base steel sheet 100. Here, a passing rate of the base steel sheet 100 passing through the plating bath may be 1 mpm to 250 mpm.

As described above, after the base steel sheet 100 passes through the plating bath at the rate of 1 mpm to 250 mpm, the first cooling operation and the second cooling operation may be performed to form the Fe—Al intermetallic compound layer 214 so that the Fe—Al intermetallic compound layer 214 may include the first layer 215 and the second layer 215 sequentially laminated.

The plating layer 200 that is formed may be an Al—Si plating layer and may be plated and formed at 40 g/m$^2$ to 200 g/m$^2$ with respect to both sides of the base steel sheet 100 or may be formed to have a thickness of 10 μm to 50 μm. For this, before the base steel sheet 100 on which the hot-dip plating layer is formed is cooled, air or gas may be sprayed onto the base steel sheet 100 to wipe the hot-dip plating layer to thereby adjust a thickness of the hot-dip plating layer.

Hereinafter, exemplary embodiments will be described in more detail. However, the following exemplary embodiments are intended to more specifically illustrate the disclosure, and the scope of the disclosure is not limited by the following embodiments. The following embodiments may be appropriately modified and changed by one of ordinary skill in the art within the scope of the disclosure.

<Manufacture of Steel Sheet for Hot Press>

After performing hot rolling, cooling/coiling, cold rolling, and annealing heat treatment on a steel slab of the following components to form a base steel sheet (to a sheet thickness of 1.2 mm), a steel sheet for hot press was manufactured by performing hot-dip plating on a surface of the base steel sheet to form a plating layer.

TABLE 1

| Components (wt %) | | | | | | | | |
|---|---|---|---|---|---|---|---|---|
| C | Si | Mn | P | S | Al | N | Ti | B |
| 0.23 | 0.24 | 1.18 | 0.015 | 0.004 | 0.03 | 0.0005 | 0.03 | 0.002 |

Hot-dip Al plating was performed by using an oxidation-free furnace-reduction furnace type line and, after plating, adjusting an adhesion amount of a hot-dip plating layer from 50 g/m² to 90 g/m² on one side by gas wiping and then cooling the hot-dip plating layer. Here, a plating bath was set to include Si of 7 wt %, Fe of 2.5 wt %, and a component of balance Al in a temperature range of 600° C. to 700° C. In addition, the base steel sheet passed through the plating bath at a rate of 100 mpm to 200 mpm and then was cooled at an average cooling rate of 25° C./s to room temperature to manufacture a steel sheet for hot press.

<Crack Inspection of Coating Layer after Hot Press Process>

Wiping of the hot-dip plating layer, the temperature of the plating bath, or the rate (an immersion time) of the base steel sheet passing through the plating path was adjusted to manufacture a specimen having different average thickness of a plating layer, area fraction of a diffusion layer with respect to the plating layer, area fraction of an Fe—Al alloy layer with respect to the diffusion layer, and area fraction of an Fe—Al intermetallic compound layer with respect to the diffusion layer as shown in Table 2 below. Thereafter, the specimen was heated up to a temperature higher than or equal to Ac3, an external force was applied to the specimen with a press, and at the same time, the specimen was quenched to measure the number of cracks generated in the plating layer. In detail, a sample was taken from the specimen to measure the area fraction of the diffusion layer with respect to the plating layer, the area fraction of the Fe—Al alloy layer with respect to the diffusion layer, and the area fraction of the Fe—Al intermetallic compound layer with respect to the diffusion layer. The specimen was heated at an average heating rate higher than or equal to 3° C./s to the temperature higher than or equal to Ac3, an external force was applied to the specimen with the press, and at the same time, the specimen was quenched at an average rate higher than or equal to 30° C./s to the temperature less than or equal to 300° C. The number of cracks generated in the plating layer per unit length (mm) at certain three points of the specimen was measured.

TABLE 2

| Classification | Plating layer thickness average | with respect to plating layer of diffusion layer area fraction | with respect to diffusion layer area fraction of Fe—Al alloy layer | with respect to diffusion layer an area fraction of Fe—Al intermetallic compound layer | crack number |
|---|---|---|---|---|---|
| Embodiment 1 | 17 μm | 10.2% | 5.9% | 94.1% | 21 |
| Embodiment 2 | 18 μm | 10.5% | 8.8% | 91.2% | 26 |
| Embodiment 3 | 18 μm | 35.0% | 2.4% | 97.6% | 23 |
| Embodiment 4 | 31 μm | 34.8% | 2.1% | 97.9% | 29 |
| Embodiment 5 | 18 μm | 34.3% | 12.1% | 87.9% | 24 |
| Embodiment 6 | 30 μm | 10.5% | 15.5% | 84.5% | 23 |
| Embodiment 7 | 39 μm | 25.6% | 10.8% | 89.2% | 22 |
| Comparative example 1 | 19 μm | 10.1% | 23.3% | 76.7% | 65 |
| Comparative example 2 | 16 μm | 10.1% | 35.8% | 64.2% | 79 |
| Comparative example 3 | 18 μm | 10.3% | 50.2% | 49.8% | 81 |
| Comparative example 4 | 18 μm | 10.1% | 63.1% | 36.9% | 86 |
| Comparative example 5 | 18 μm | 10.5% | 82.7% | 17.3% | 87 |
| Comparative example 6 | 19 μm | 10.6% | 98.2% | 1.8% | 98 |

As shown in Table 2 above, in the case of embodiments 1 to 7 in which the area fraction of the Fe—Al intermetallic compound layer with respect to the diffusion layer was within a range of 84.5% to 98.0% the number of cracks generated in the plating layer was much less than in comparative examples 1 to 6 in which the area fraction of the Fe—Al intermetallic compound layer with respect to the diffusion layer was less than 84.5%. This is because the area fraction of the Fe—Al intermetallic compound layer with respect to the diffusion layer was greater than or equal to 84.5% to effectively absorb an external force causing cracks in the plating layer during a hot press process. As a result, the occurrence of cracks in the plating layer may be prevented or minimized. As described above, when the area fraction of the Fe—Al intermetallic compound layer exceeds 98.0%, an average thickness of the Fe—Al alloy layer is relatively reduced. Therefore, liquid metal embrittlement may not be prevented, and the Fe—Al intermetallic compound layer, which has an area fraction exceeding 98.00 within a temperature range of the plating bath as described above, may not be secured.

Table 3 below shows a result of measuring the number of cracks generated in the plating layer as follows. In the same conditions in addition to embodiments 1 to 7, a base steel, which passed through a plating bath, was cooled at an average cooling rate of 15° C./s up to 550° C. and cooled at an average cooling rate of 30° C./s from 550° C. to room temperature to manufacture a steel sheet for hot press. In addition, a specimen was manufactured in the same conditions as in Table 2 above, the specimen was heated up to a temperature higher than or equal to Ac3, an external force was applied to the specimen with a press, and at the same time, the specimen was quenched to thereby the number of cracks generated in the plating layer.

TABLE 3

| Classification | Plating layer thickness average | with respect to plating layer of diffusion layer area fraction | with respect to diffusion layer area fraction of Fe—Al alloy layer | with respect to diffusion layer area fraction of Fe—Al intermetallic compound layer | Fe—Al intermetallic compound layer structure | crack number |
|---|---|---|---|---|---|---|
| Embodiment 1 | 17 μm | 10.2% | 5.9 % | 94.1% | one layer | 21 |
| Embodiment 2 | 18 μm | 10.5% | 8.8 % | 91.2% | one layer | 26 |
| Embodiment 3 | 18 μm | 35.0% | 2.4 % | 97.6% | one layer | 23 |
| Embodiment 4 | 31 μm | 34.8% | 2.1 % | 97.9% | one layer | 29 |
| Embodiment 5 | 18 μm | 34.3% | 12.1 % | 87.9% | one layer | 24 |
| Embodiment 6 | 30 μm | 10.5% | 15.5 % | 84.5% | one layer | 23 |
| Embodiment 7 | 39 μm | 25.6% | 10.8 % | 89.2% | one layer | 22 |
| Embodiment 8 | 18 μm | 10.1% | 2.1% | 97.9% | two layers | 8 |
| Embodiment 9 | 19 μm | 10.3% | 10.8 % | 89.2% | two layers | 7 |
| Embodiment 10 | 17 μm | 10.2% | 15.5% | 84.5% | two layers | 8 |
| Embodiment 11 | 16 μm | 24.9% | 2.0 % | 98.0% | two layers | 6 |
| Embodiment 12 | 18 μm | 34.8% | 15.4% | 84.6% | two layers | 9 |
| Embodiment 13 | 30 μm | 10.2% | 2.2 % | 97.8% | two layers | 7 |
| Embodiment 14 | 31 μm | 10.0% | 15.1 % | 84.9% | two layers | 10 |
| Embodiment 15 | 30 μm | 34.7% | 15.3 % | 84.7% | two layers | 9 |
| Embodiment 16 | 38 μm | 10.1% | 2.4 % | 97.6% | two layers | 7 |
| Embodiment 17 | 40 μm | 34.5% | 15.4 % | 84.6% | two layers | 11 |

As shown in Table 3 above, in embodiments 1 to 7 in which cooling was performed at an average cooling rate of 25° C./from the temperature of the plating bath to the room temperature, the Fe—Al intermetallic compound layer structure was formed in one layer. However, in the case of embodiments 8 to 17 in which the base steel was cooled at an average cooling rate of 15° C./s up to 550° C. and cooled at an average cooling rate of 30° C./s from 550° C. to the room temperature, the Fe—Al intermetallic compound layer structure had a two-layer structure in which a first layer and a second layer were laminated. In addition, when the Fe—Al intermetallic compound layer had a two-layer structure, the number of cracks generated in the plating layer was more reduced.

This is, as described above, because the first layer and the second layer operate as a buffer absorbing an external force causing cracks, and, although cracks occur in a hard Fe—Al alloy layer, crack propagation at an interface formed during the hot press process blocks transmission of cracks generated in the Fe—Al alloy layer to the plating layer. In addition, as the Fe—Al intermetallic compound layer has a two-layer structure, the plating layer may be formed to have a high bonding strength.

According to exemplary embodiments of the present invention, as a plating layer may include an Fe—Al intermetallic compound layer, the occurrence of cracks in a steel sheet for hot press during a hot press process may be more effectively prevented or minimized.

In addition, the Fe—Al intermetallic compound layer may include a first layer and a second layer, having a greater hardness than the first layer, which are sequentially laminated, thereby improving an adhesion of the plating layer.

While the present invention is described with reference to exemplary embodiments with reference to the figures, it should be understood that exemplary embodiments described herein should be considered in a descriptive sense only and it will be understood by those of ordinary skill in the art that various changes in form and details may be made therein. Thus, the scope of the present invention for protection should be determined without departing from the spirit and scope of the disclosure as defined by the following claims.

What is claimed is:

1. A steel sheet for hot press forming, the steel sheet comprising:
   a base steel sheet; and
   a plating layer disposed on the base steel sheet, wherein the plating layer comprises a diffusion layer and a surface layer that are sequentially laminated,
   wherein the diffusion layer comprises an Fe—Al alloy layer and an Fe—Al intermetallic compound layer that are sequentially disposed on the base steel sheet and each of which includes silicon, the Fe—Al intermetallic compound layer comprises a first layer and a second layer that are sequentially laminated, and a second hardness of the second layer is greater than a first hardness of the first layer, and
   an area fraction of the Fe—Al intermetallic compound layer with respect to the diffusion layer is 84.5% to 98.0%.

2. The steel sheet of claim 1, and
   wherein a hardness of the Fe—Al alloy layer is greater than the first hardness of the first layer and the second hardness of the second layer.

3. The steel sheet of claim 1, wherein an area fraction of the diffusion layer with respect to the plating layer is 10% to 35%.

4. The steel sheet of claim 2, wherein, in the Fe—Al alloy layer, the first layer, and the second layer, a content of aluminum in the first layer is the least, and a content of silicon in the first layer is the greatest.

5. The steel sheet of claim 2, wherein an average thickness of the first layer is 50 nm to 500 nm, and an average thickness of the second layer is 1 μm to 16 μm.

6. The steel sheet of claim 1, wherein an average thickness of the Fe—Al alloy layer is 50 nm to 500 nm.

7. The steel sheet of claim 6, wherein an area fraction of the Fe—Al alloy layer with respect to the diffusion layer is 2.0% to 15.5%.

8. The steel sheet of claim 1, wherein the base steel sheet comprises carbon (C) in an amount of 0.01 wt % to 0.5 wt %, silicon (Si) in an amount of 0.01 wt % to 1.0 wt %, manganese (Mn) in an amount of 0.5 wt % to 3.0 wt %, phosphorus (P) in an amount greater than 0 wt % and less than or equal to 0.05 wt %, sulfur (S) in an amount greater than 0 wt % and less than or equal to 0.01 wt %, aluminum (Al) in an amount greater than 0 wt % and less than or equal to 0.1 wt %, nitrogen (N) in an amount greater than 0 wt % and less than or equal to 0.001 wt %, balance iron (Fe), and other inevitable impurities.

9. The steel sheet of claim 8, wherein the base steel sheet further comprises one or more of niobium (Nb), titanium (Ti), chromium (Cr), molybdenum (Mo), and boron (B).

10. A method of manufacturing a steel sheet for hot press forming of claim 1, the method comprising:
- forming a hot-dip plating layer on a surface of a base steel sheet by immersing the base steel sheet, which is cold-rolled or hot-rolled, into a plating bath having a temperature of 650° C. to 700° C.; and
- a cooling operation of forming a plating layer by cooling the base steel sheet on which the hot-dip plating layer, wherein
- the plating bath comprises silicon in an amount of 4 wt % to 12 wt %, iron in an amount of 1.0 wt % to 4.0 wt %, and balance aluminum,
- the cooling operation comprises: a first cooling operation of cooling the base steel sheet at a first average cooling rate up to 550° C.; and a second cooling operation of cooling the base steel sheet at a second average cooling rate up to room temperature, and
- the first average cooling rate is greater than the second average cooling rate.

11. The method of claim 10, wherein the first average cooling rate is greater than or equal to 20° C./s.

12. The method of claim 10, wherein:
- the base steel sheet passes through the plating bath and is immersed in the plating bath, and
- a passing rate of the base steel sheet passing through the plating bath is 1 mpm to 250 mpm.

13. The method of claim 10, further comprising:
- before the cooling operation, adjusting a thickness of the hot-dip plating layer by spraying air or gas onto the base steel sheet.

* * * * *